(12) United States Patent
Dixit et al.

(10) Patent No.: US 7,917,523 B2
(45) Date of Patent: Mar. 29, 2011

(54) METHOD AND SYSTEM FOR PROVIDING IMPROVED URL MANGLING PERFORMANCE USING FAST RE-WRITE

(75) Inventors: Vineet Dixit, Mountain View, CA (US); Siva S. Jayasenan, Cupertino, CA (US); Mahadev Somasundaram, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 492 days.

(21) Appl. No.: 11/399,013

(22) Filed: Apr. 5, 2006

(65) Prior Publication Data
US 2007/0239732 A1 Oct. 11, 2007

(51) Int. Cl.
G06F 7/00 (2006.01)
G06F 17/30 (2006.01)
G06F 17/00 (2006.01)

(52) U.S. Cl. ...................................... 707/756; 707/693
(58) Field of Classification Search ................. 707/10, 707/206, 999.01, 999.206, 756, 693
See application file for complete search history.

(56) References Cited

U.S. PATENT DOCUMENTS

| | | | |
|---|---|---|---|
| 5,068,895 A * | 11/1991 | Shimada | 380/28 |
| 6,108,655 A | 8/2000 | Schleimer et al. | |
| 6,131,163 A | 10/2000 | Wiegel | |
| 6,249,787 B1 | 6/2001 | Schleimer et al. | |
| 6,286,046 B1 * | 9/2001 | Bryant | 709/224 |
| 6,385,615 B1 | 5/2002 | Haeri et al. | |
| 6,442,714 B1 | 8/2002 | Griffin et al. | |
| 6,505,254 B1 | 1/2003 | Johnson et al. | |
| 6,529,894 B1 | 3/2003 | Haeri et al. | |
| 6,584,507 B1 | 6/2003 | Bradley et al. | |
| 6,587,000 B2 | 7/2003 | Oikawa | |
| 6,604,241 B1 | 8/2003 | Haeri et al. | |
| 6,628,644 B1 | 9/2003 | Nelson et al. | |
| 6,697,964 B1 | 2/2004 | Dodrill et al. | |
| 6,728,767 B1 | 4/2004 | Day et al. | |
| 6,766,298 B1 | 7/2004 | Dodrill et al. | |
| 6,766,351 B1 | 7/2004 | Datla | |
| 6,779,154 B1 | 8/2004 | Nussbaum et al. | |
| 6,850,980 B1 | 2/2005 | Gourlay | |
| 6,895,433 B1 | 5/2005 | Slater et al. | |
| 6,907,565 B1 | 6/2005 | Huang | |

(Continued)

FOREIGN PATENT DOCUMENTS
EP 07781286.5 10/2009

OTHER PUBLICATIONS

B. Ravikumar, Peg-Solitaire, String Rewriting Systems and Finite Automata (1997), ISAAC: 8th International Symposium on Algorithms and Computation (http://citeseer.ist.psu.edu/old/ravikumar97pegsolitaire.html).*

(Continued)

*Primary Examiner* — Mohammad Ali
*Assistant Examiner* — Alexey Shmatov
(74) *Attorney, Agent, or Firm* — Cesari and McKenna, LLP; Michael R. Reinemann

(57) ABSTRACT

Method and system for providing improved uniform resource locator (URL) mangling performance using fast re-write including scanning a web page, detecting an absolute URL in the web page, and modifying the detected absolute URL to a corresponding relative URL in the web page, is disclosed.

28 Claims, 5 Drawing Sheets

U.S. PATENT DOCUMENTS

| | | |
|---|---|---|
| 6,917,626 B1 | 7/2005 | Duvvury |
| 6,920,205 B2 | 7/2005 | Hahn et al. |
| 6,954,896 B1 | 10/2005 | Dodrill et al. |
| 6,957,256 B1 | 10/2005 | Bradley et al. |
| 6,968,389 B1 | 11/2005 | Menditto et al. |
| 6,970,944 B2 | 11/2005 | Johnson et al. |
| 6,981,029 B1 | 12/2005 | Menditto et al. |
| 6,983,288 B1 | 1/2006 | Kirkwood et al. |
| 7,003,550 B1 | 2/2006 | Cleasby et al. |
| 7,016,964 B1 | 3/2006 | Still et al. |
| 7,107,234 B2 * | 9/2006 | Deguchi ............... 705/26 |
| 7,155,491 B1 * | 12/2006 | Schultz et al. ......... 709/217 |
| 2003/0061353 A1 | 3/2003 | Johnson et al. |
| 2003/0182375 A1 | 9/2003 | Zhu et al. |
| 2004/0139204 A1 * | 7/2004 | Ergezinger et al. ...... 709/229 |
| 2004/0225679 A1 | 11/2004 | Oran |
| 2004/0234048 A1 | 11/2004 | Hahn et al. |
| 2004/0246946 A1 | 12/2004 | Nelson et al. |
| 2005/0004977 A1 | 1/2005 | Roberts et al. |
| 2005/0021626 A1 | 1/2005 | Prajapat et al. |
| 2005/0044138 A1 | 2/2005 | Albert et al. |
| 2005/0235036 A1 * | 10/2005 | Nielsen et al. ......... 709/206 |
| 2005/0256955 A1 | 11/2005 | Bodwell et al. |
| 2006/0168101 A1 * | 7/2006 | Mikhailov et al. ...... 709/217 |
| 2006/0206571 A1 * | 9/2006 | Kuwahara .............. 709/206 |

OTHER PUBLICATIONS

International Search Report and Written Opinion of the International Searching Authority for International Application No. PCT/US2007/065914 filed Apr. 4, 2007 to Cisco, et al. mailed Jun. 18, 2008.

* cited by examiner

METHOD AND SYSTEM FOR PROVIDING IMPROVED URL MANGLING PERFORMANCE USING FAST RE-WRITE

FIELD OF THE INVENTION

The present invention relates to data network management. More specifically, the present invention relates to method and system for providing improved uniform resource locator (URL) mangling performance using fast re-write techniques.

BACKGROUND

In secure socket layer virtual private network (SSLVPN) implementations, uniform resource locators (URLs) need to be rewritten in contents such as hypertext markup language (HTML), Javascripts or Stylesheets, for example. More specifically, URL rewriting process typically requires a packet by packet inspection of the user session for secure access to a private network via a SSLVPN in order to search for the appropriate or corresponding URL references, and to rewrite those corresponding or appropriate URL references into one or more different formats.

In such implementation, the rewriting process of the URL references require significant packet scanning and thus a substantial processing capacity is typically allocated to the packet scanning. More specifically, absolute URLs impose greater computational demand in processing capacity, as compared to relative URLs. That is, upon locating an absolute URL, it is necessary to break down the absolute URL into segments or pieces to extract, for example, scheme, hostname, port information, and path. Then, a URL is re-written so that it points to the SSLVPN gateway along with the earlier located absolute URL embedded in it. Often, URLs are lengthy and may require multiple packet inspection and/or buffering.

In view of the foregoing, it would be desirable to have methods and systems for providing improved uniform resource locator (URL) mangling performance using fast re-write. More specifically, it would be desirable to have a method and system to rewrite URLs while without breaking down the absolute URLs into components and performing rewrite process.

SUMMARY OF THE INVENTION

In view of the foregoing, in accordance with the various embodiments of the present invention, there are provided methods and systems for efficient mangling of absolute URLs by SSLVPN gateways by transposing the absolute URL into a relative URL while preserving the original packet buffer and reducing the number of scans over an absolute URL appearing within an HTML document.

These and other features and advantages of the present invention will be understood upon consideration of the following detailed description of the invention and the accompanying drawings.

DETAILED DESCRIPTION

Figure 1:
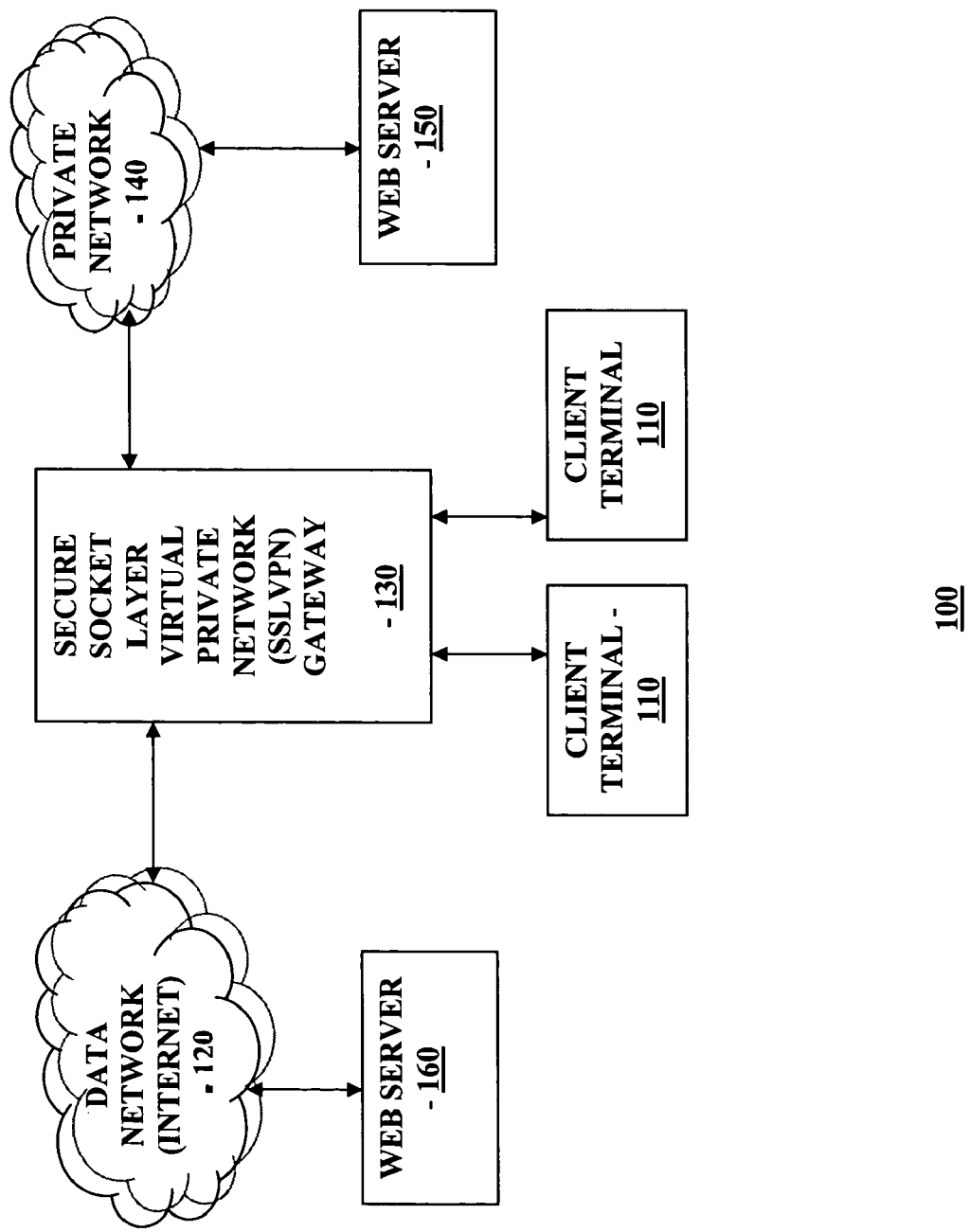
FIG. 1 is a block diagram of an overall data network for practicing one or more embodiments of the present invention.

FIG. 1 is a block diagram of an overall data network for practicing one or more embodiments of the present invention. Referring to FIG. 1, the overall network 100 includes a data network 120 such as the internet for public access, and to which a webserver 160 is operatively coupled. The data network 120 is in turn configured to couple to a Secure Socket Layer Virtual Private Network (SSLVPN) gateway 130. Also shown in FIG. 1 are a plurality of client terminals 110 operatively coupled to the SSLVPN gateway 130 over a wired or wireless connection. In addition, referring to FIG. 1, the SSLVPN gateway 130 is operatively coupled to one or more private networks 140, and each of which may be coupled to one or more web servers 150.

Referring to FIG. 1, while only one SSLVPN gateway 130 operatively coupled to the private network 140, which in turn is coupled to web server 150, within the scope of the present invention, multiple private networks 140 may be provided and operatively coupled to one or more SSLVPN gateways 130, and further, a plurality of web servers 150 may be operatively coupled to a corresponding one or more private networks 140.

In one embodiment, the SSLVPN gateway 130 is configured to provide secure access to the private network 140 to reach or access the information or data resident in the web server 150, or similarly, to provide secure communication with the web server 150 operatively coupled to the private network 104 via the SSLVPN gateway 130. Moreover, the SSLVPN gateway 130 may be configured to provide access to webserver 160 over the public data network 120. In this manner, client terminal 110 may be configured to access the private network 140 via the SSLVPN gateway 130. In addition, the client terminal 110 may be configured to access web server 160 over a public data network 120 such as the Internet via the SSLVPN gateway 130.

The SSLVPN gateway 130 is configured to handle different URL types in the following manner. For example, the SSLVPN gateway 130 may perform URL mangling on an absolute URL such as "http://wwwin.internal.com/eng/index.html", which in one embodiment, becomes "https://sslvpn-gateway-ip/80/wwwin.internat.com/eng/index.html".

On the other hand, the SSLVPN gateway 130 may be configured to handle a relative URL starting with a "/" which simply has path specified differently.

That is, for example, in one embodiment, the SSLVPN gateway 130 may be configured to perform URL mangling on a relative URL such as, for example: "/eng/index.html", which in one embodiment, may be converted to the following: "/http/80/www.internal.com/eng/index.html", where the port and host information is received from the base URL of the web page. In this manner, browsers resolve relative URLs starting with a "/" assuming it starts at root level on a server from where the web page was received. Since the client terminal 110 browsers perceive SSLVPN gateway 130 as a server, adding "/http/80/www.internal.com" sufficiently identifies the relative URL for appropriately directing the client browser to the corresponding web page including the relative URL.

The third type of URLs include relative URLs that do not start with a "/". These URLs do not need to be mangled by the SSLVPN gateway 130 since the browser on the client terminal 110 is configured to resolve these URLs with respect to the directory or file at the lead-node of the file system. For example, an anchor tag definition <a href="directory-x/directory-y/directory-z/alpha.html"> that appears include document "http://webserver-ip/test.html" may be resolved as http://webserver-ip/directory-x/directory-y/directory-z/alpha.html.

Referring back to FIG. 1, as described in further detail below, web pages such as html pages residing in the web server 150 includes text, graphics, as well as URLs each of which may point to another web server 150 coupled to the private network 140, or alternatively, which may point to a publicly available web terminal outside of the private network 140. In response to an access request received from the client terminal 110, the SSLVPN gateway 130 is configured to retrieve the corresponding web page or other document from the web server 150 over the private network 140 or the webserver 160 over the public network 120. Thereafter, the SSLVPN gateway 130 is configured to perform URL mangling with fast re-write of any embedded URLs in the retrieved web page or document and then provides the web page to the client terminal 110 that requested the information or web page.

In one embodiment, access to SSLVPN gateway 130 may require authentication of the user at the client terminal 110 by, for example, requesting a user name and password. Alternatively, any other suitable authentication mechanism may be employed to verify the user requesting access to the private network 140 via the SSLVPN gateway 130. Furthermore, within the scope of the present invention, the SSLVPN gateway 130 may be configured to substantially dynamically perform the URL mangling with fast re-write by, for example, detecting each absolute URL in the requested web page, and modifying the absolute URL to a corresponding relative URL starting with "/", for example.

More specifically, in one aspect, a URL may be determined to be an absolute URL based on the URL scheme—for example, each of the following that includes ":" will be determined to be an absolute URL: http://, https://, ftp://, telnet:// and so on. Furthermore, URLs which begin with a scheme that does not have a protocol registered by the browser may be handled as a relative URL. For example, if the protocol scheme "http:" from the URL http://www.internal.com, with "httpX//", by replacing the ":" with a character such as for example, "X", then the resulting URL "httpX//www.internal.com" may be handled as a relative URL.

In this manner, as described in further detail below, in one embodiment of the present invention, SSLVPN gateway 130 is not required to scan each URL in the web page to which the client terminal requested access until the end of the URL, and thereafter break it down or parse the URL into various components such as port, hostname, and so on, and then to rewrite it as a mangled URL. Moreover, in another aspect of the present invention, the number of characters in the original URL (or pre-mangled URL) may be preserved such that there is no need to allocate a new packet buffer, and further, the original packet may be reused. This may be particularly suitable for URL mangling in a lower level forwarding path such as a network device driver where performance is comparatively important.

In this manner, in accordance with the various embodiments of the present invention, the SSLVPN devices may be configured to perform minimal processing during content scanning and/or re-writing, such that the processor intensive task of scanning a URL and finding server, port and path information for each URL on a requested web page may be postponed until the user at the client terminal 110, for example, selects the URL by clicking on it on web page. This approach may be suitable for objects served by a webserver 150 which may contain many URL links, but which, a user may selects only a handful of the URL links displayed on the web pages.

Figure 2:
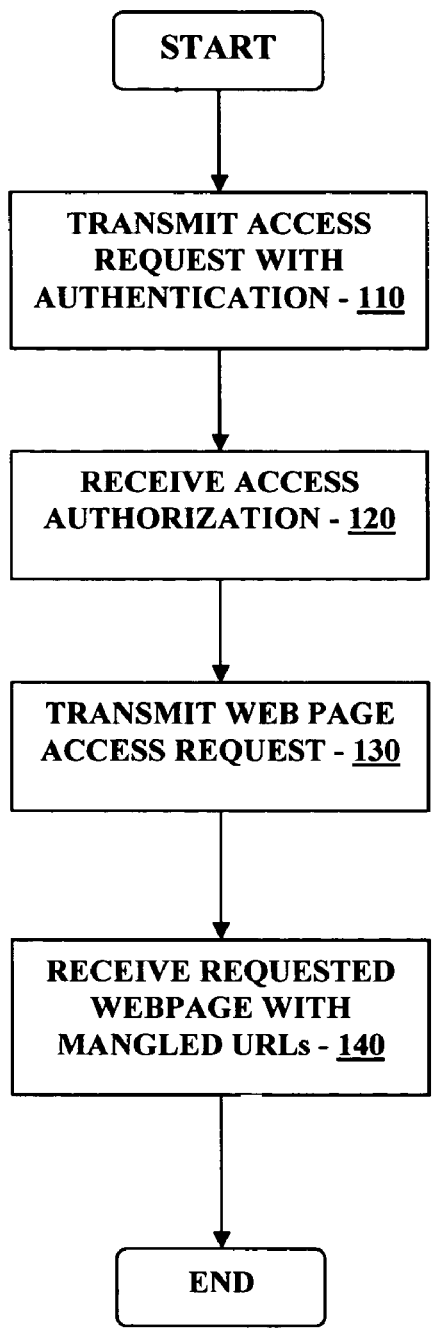
FIG. 2 is a flowchart illustrating client terminal authenticated access to a private network for server access in accordance with one embodiment of the present invention.

FIG. 2 is a flowchart illustrating client terminal authenticated access to a private network for server access in accordance with one embodiment of the present invention. Referring to FIG. 2, at step 110, a user at client terminal 110 (FIG. 1) connected to the data network 120 transmits access request with authentication information to the SSLVPN gateway 130 (FIG. 1) to securely access the private network 140. Thereafter at step 120, the user at client terminal 110 receives access authorization from the SSLVPN gateway 130, thus establishing a secure data connection between the client terminal 110 and the private network 140 over the SSLVPN gateway 130.

Referring to FIG. 2, after establishing the secure data connection between the client terminal 110 and the private network 140 over the SSLVPN gateway 130 at step 120, the user at client terminal 110 may transmit one or more requests for accessing documents, files, web pages or any other information residing in the web server 150 in the private network 140. Thereafter, the requested web page or information is received over the secure data connection from the web server 150 in the private network 140 over the SSLVPN gateway 130. In one embodiment, the SSLVPN gateway 130 is configured to modify any detected absolute URL in the requested web page to a corresponding relative URL. Alternatively, the SSLVPN gateway 130 may be configured to mangle the detected absolute URLs in the requested web page when the user using the browser at the client terminal 110 has selected the particular URL.

In this manner, in one embodiment of the present invention, one or more client terminals 110 may be configured to establish secure data connection to a private network 140 via a SSLVPN gateway 130 such that the user may access information residing in the private network 140 from a remote location or connection, outside of the private network 140.

Figure 3:
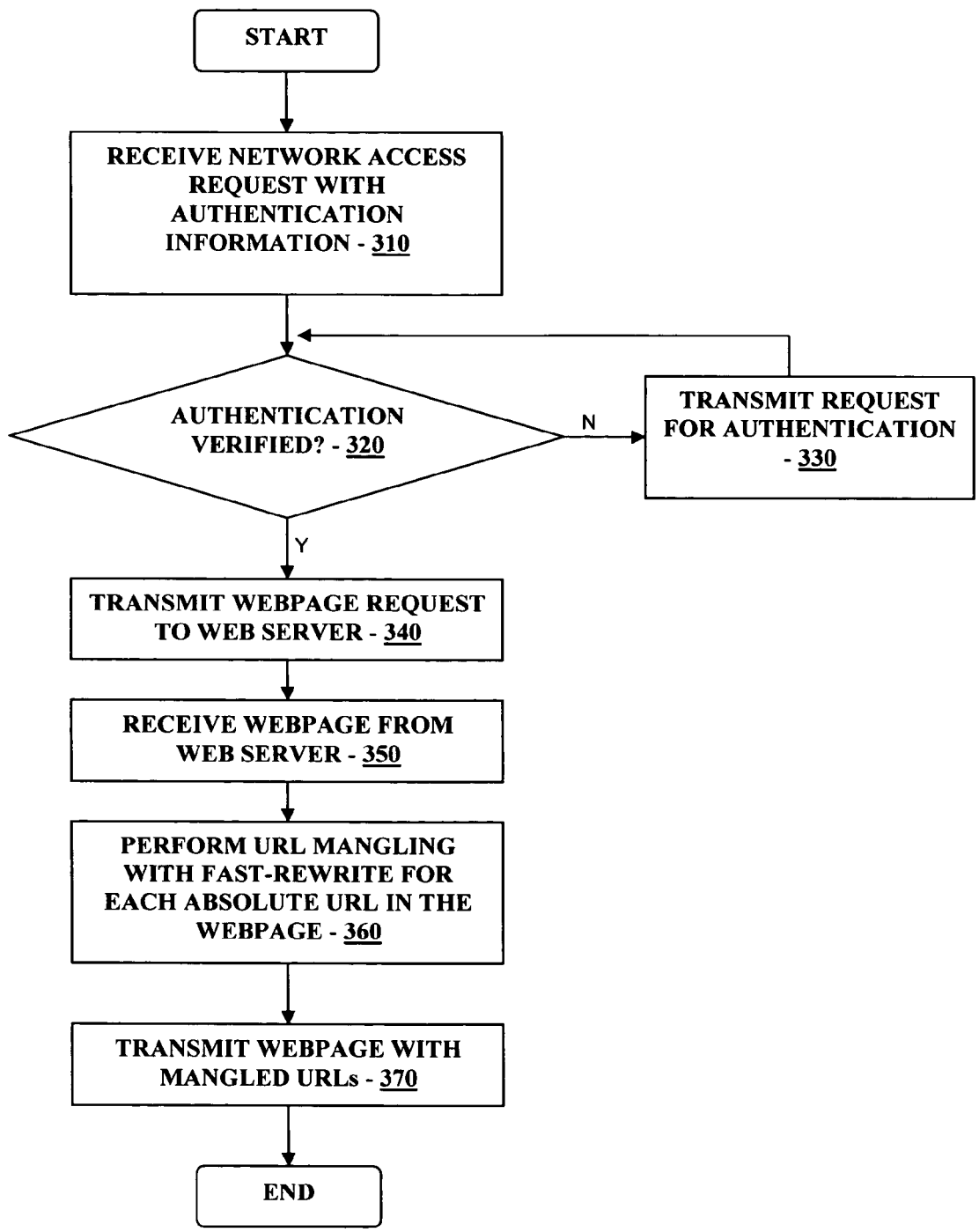
FIG. 3 is a flowchart illustrating uniform resource locator (URL) mangling with fast re-write in accordance with one embodiment of the present invention.

FIG. 3 is a flowchart illustrating uniform resource locator (URL) mangling with fast re-write in accordance with one embodiment of the present invention. Referring to FIG. 3, at step 310, network access request with authentication information is received from a client terminal 110 (FIG. 1), and thereafter, the SSLVPN gateway 130 (FIG. 1) is configured to verify authentication information received to access the private network 140 (FIG. 1). If at step 320 it is determined that the private network 140 access request authentication is not verified, then at step 330, a request for authentication information is transmitted to the client terminal 110 which is requesting access to the private network 140. In one embodiment, this process may be repeated a predetermined number of times to verify the authentication information received, and if each attempt fails, then the client terminal 110 is configured to receive a notification indicating that the requested access to the private network 140 cannot be completed, and/or that the number of attempts exceeds the predetermined number of attempts allowable within a given period of time. Thereafter, the routine may terminate.

On the other hand, referring back to FIG. 1, if at step 320 the received authentication information is verified, then at step 340, a web page request received from the client terminal 110 is transmitted to the web server 150 via the private network 140 which is operatively coupled to the SSLVPN gateway 130. Thereafter, at step 350 the requested web page is received from the web server 150, and at step 360, in one embodiment of the present invention, URL mangling with fast re-write is performed by the SSLVPN gateway 130. That is, as discussed in further detail below, in one embodiment, each absolute URL in the web page received at step 350 from the web server 150 are modified to a corresponding relative URL starting with a "/".

Referring again to FIG. 33, after performing URL mangling with fast re-write at step 360, the web page with the mangled URLs is transmitted to the client terminal 110 which requested the web page. In one embodiment of the present invention, the process described in conjunction with FIG. 3 may be repeated such that the browser at the client terminal 110 may access a plurality of web pages which may be resident in one or more web servers 150 in the private network 140. Moreover, in this manner, the SSLVPN gateway 130 in one embodiment may be configured to avoid scanning each URL in the requested web page until it reaches the end of the URL, and then breaking down the URL into components to rewrite as a mangled URL.

Figure 4:
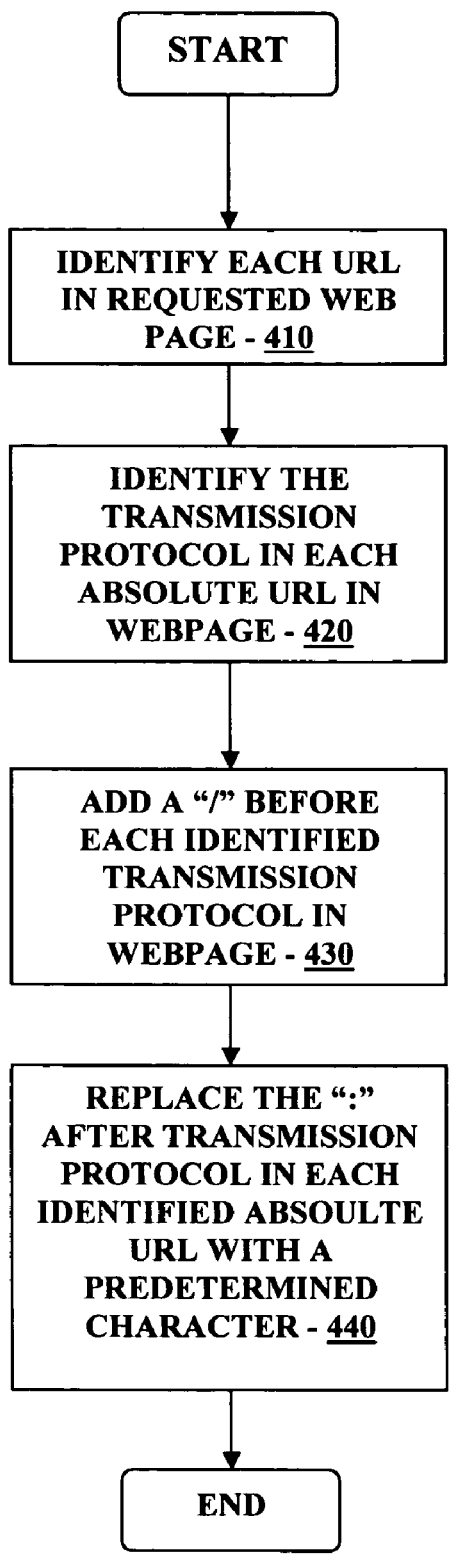
FIG. 4 is a flowchart illustrating the URL mangling with fast re-write step of FIG. 3 in accordance with one embodiment of the present invention.

FIG. 4 is a flowchart illustrating the URL mangling with fast re-write step of FIG. 3 in accordance with one embodiment of the present invention. Referring to FIG. 4, at step 410 each URL in the requested web page is identified. For example, in one embodiment, the SSLVPN gateway 130 may be configured to detect each URL in the requested web page and to identify the absolute URLs. Thereafter, at step 420, a corresponding transmission protocol for each identified URL is determined. Thereafter, at step 430, in one embodiment of the present invention, for each identified transmission protocol associated with each URL on the web page, a "/" is added before the identified transmission protocol in the character spring of the URL. Then, at step 440, the ":" in the transmission protocol in each identified URL is replaced with a predetermined character such as "X".

For example, in one embodiment, given an identified absolute URL of "http:", at step 430, the "/" is added to the beginning of the identified transmission protocol, and at step 440, the ":" is replaced with a predetermined character such as "X" so that the identified absolute URL in this example, when mangled with fast re-write, becomes "/httpX". In this case, the SSLVPN gateway 130 in one embodiment is configured to proceed with dismantling the mangled URL to find the respective hostname, port information and so on, to provide the requested web page to the client terminal 110 which requested access to the web page from the private network 140. In one embodiment, the predetermined character may include any alphanumeric character that can replace the ":" in the identified absolute URL. Thus, in accordance with one embodiment of the present invention, the absolute URL in the requested web page may be modified to a corresponding relative URL by the SSLVPN gateway 130.

Figure 5:
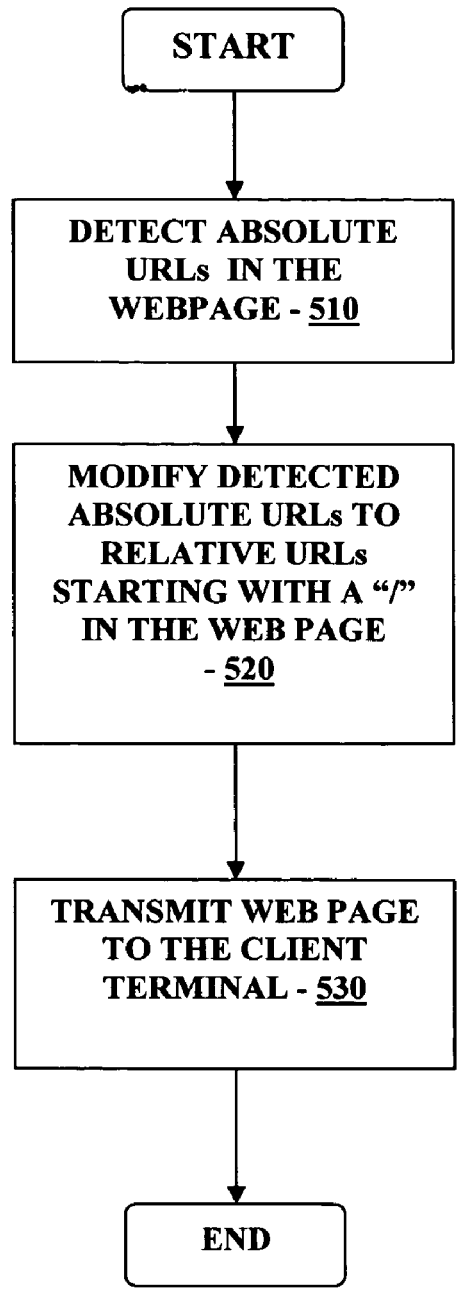
FIG. 5 is a flowchart illustrating the URL mangling with fast re-write step of FIG. 3 in accordance with another embodiment of the present invention.

FIG. 5 is a flowchart illustrating the URL mangling with fast re-write step of FIG. 3 in accordance with another embodiment of the present invention. Referring to FIG. 5, in one embodiment of the present invention, at step 510, each absolute URL in the requested web page from the web server 150 are detected by the SSLVPN gateway 130. In one embodiment, the SSLVPN gateway 130 is configured to detect the absolute URLs in the requested web page from the web server 150 by detecting a ":" in the URL transmission protocol of the web page received from the web server 150.

Referring to FIG. 5, having detected each absolute URL in the requested web page received from the web server 150, at step 520, the SSLVPN gateway 130 in one embodiment is configured to perform URL mangling with fast re-write by modifying the detected absolute URLs to a corresponding relative URLs starting with a "/" for the web page. In one aspect, the SSLVPN gateway 130 is configured to modify the absolute URL to the corresponding relative URL starting with a "/" by replacing the ":" in the URL after the transmission protocol, with a "/". Thereafter, the web page with mangled URLs is transmitted or provided to the client terminal 110 where a browser may display the web page which was requested from the web server 150 in the private network 140 over the SSLVPN gateway 130.

In the manner described above, in accordance with the various embodiments of the present invention, there are provided methods and systems for efficient mangling of absolute URLs by SSLVPN gateways by transposing the absolute URL into a relative URL while preserving the original packet buffer and reducing the number of scans over an absolute URL appearing within objects served by the web server 150 which may contain many URL links an HTML document.

By way of an example, scan operation involves inspecting packet buffer for a URL one character at a time to find the URL boundary based on the document or object structure. Additionally, server, port and path information may also be marked during this scanning operation. It should be noted that fragmentation may render the scanning operation more difficult and may need copying of a URL to a temporary buffer. Notwithstanding the fragmentation referenced above, given the following URL with 72 characters:

<a href="http://wwwjango.com:80/warp/public/779/largeent/sitemap/sm_guest.html"> which shows the URL scheme as the hyper text transmission protocol (http), with the server domain (wwwjango.com) associated with port (80), and having the path (warp/public/779/largeent/sitemap/sm_guest.html), the scan operation will require more than 72*n instructions, where n is the number of instructions to scan one character.

A rewrite operation may include writing the mangled URL to an output buffer based on the information determined during the scan operation described above as, the domain, port and path information which will result in the following mangled URL with 84 characters:

<a href="https://sslvpn-gw.jango.com:80/warp/public/779/largeent/sitemap/sm_guest.html"> which, as can be seen comprises of copy operation for a substantial portion of the URL, and requires 84*m instructions, where m is the number of instructions to copy each character in the URL.

By contrast, in one embodiment, the URL mangling with fast rewrite procedure may result in the following mangled URL <a href="/httpX/www.jango.com:SO/warp/public1779/largeentisitemap/sm_guest.html"> and which may be retained in the original packet buffer. More specifically, in one embodiment of the present invention, this operation of URL mangling with fast rewrite involves scanning and replacing a single character (that is, the ":" character in the URL), and may take approximately 5*n instructions, where n is the number of instructions to scan one character.

That is, in one embodiment of the present invention, absolute URLs in a web page may be modified such that the browsers requesting access to the webpage perceive the absolute URLs as relative URLs. For example, by substituting "http://" of the absolute URL with "/httpX/", the absolute URL may be modified to a relative URL. Alternatively, the "http:" of the absolute URL maybe substituted with "/http" to be modified to a relative URL and provided to the SSVLVPN gateway to provide access to the browser accessing request to the absolute URL.

Further, within the scope of the present invention, the absolute URLs may be modified with other patterns or characters which the SSLVPN gateway is aware of. As such, the SSLVPN gateway may be configured to interpret the now modified relative URL upon detecting or seeing "/httpX/", and proceeds with dismantling the URL to find, for example, hostname, port information and so on.

Accordingly, in one embodiment, it is possible to avoid scanning of URLs beyond the first few characters. Modification may be made in the original packet itself in order to avoid processor intensive operation of getting new buffers and copying. This may enable URL mangling in CEF path.

Indeed, a method of providing uniform resource locator (URL) mangling in one embodiment of the present invention may include the steps of scanning a web page, detecting an absolute URL in the web page, and modifying the detected absolute URL to a corresponding relative URL in the web page.

The step of detecting the absolute URL in one embodiment may include the step of detecting a ":" in the URL.

Moreover, the step of modifying the detected absolute URL in one aspect may include the step of replacing a ":" in the absolute URL with a predetermined character, where the predetermined character may include an alphanumeric character.

In a further aspect, the method may further include the step of transmitting the web page after the modifying step.

A method of performing URL mangling in accordance with yet another embodiment of the present invention may include receiving an access request to a web page, receiving the requested web page, detecting a URL in the web page, and mangling the detected URL by replacing a colon in the detected URL with a predetermined character.

The detected colon in one embodiment may be located in the URL after the transmission protocol which may include hyper text transmission protocol.

The access request in one aspect may be received over a public data network.

Further, the requested web page may be received over a private data network, such as, for example, from a web server in the private data network.

A method of providing URL mangling in accordance with still another embodiment of the present invention may include detecting an absolute URL in a web page, and performing URL mangling on the detected absolute URL by modifying the detected absolute URL to a relative URL.

In one aspect, the step of performing URL mangling may include the step of replacing a colon in the absolute URL with a predetermined character.

In addition, the step of detecting the absolute URL in still another aspect may include the steps of scanning the web page, and identifying a colon in the URL, which may, for example, be located immediately following the transmission protocol of the URL.

A system for providing URL mangling in accordance with still another embodiment of the present invention may include a server terminal, and a gateway terminal operatively coupled to the server terminal, the gateway terminal configured to receive a web page from the server terminal, and further, wherein the gateway terminal is configured to scan the received web page, the gateway terminal further configured to modify an absolute URL in the web page to a relative URL.

The gateway terminal may in one aspect include a secure socket layer virtual private network (SSLVPN) gateway terminal.

The gateway terminal may be in a further aspect operatively coupled to a private data network including the server terminal.

In yet another aspect, a client terminal may be operatively coupled to the gateway terminal over a public data network, and further, where the gateway terminal maybe configured to transmit the web page with modified URL to the client terminal.

A system for providing URL mangling in accordance with yet still a further embodiment of the present invention may include means for scanning a web page, means for detecting an absolute URL in the web page, and means for modifying the detected absolute URL to a corresponding relative URL in the web page.

The various processes described above including the processes performed by the SSLVPN gateway 130 in the software application execution environment in the data network 100 including the processes and routines described in conjunction with FIGS. 2-5, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the SSLVPN gateway 130, may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of providing uniform resource locator (URL) mangling, comprising the steps of:

receiving a web page requested by a client terminal at a gateway;

scanning the web page at the gateway;

detecting an absolute URL in the web page, the absolute URL having a transmission protocol portion, and a colon located after the transmission protocol portion;

placing at least a portion of the detected absolute URL in a packet buffer of a forwarding path at the gateway; and modifying, by the gateway, the at least a portion of the detected absolute URL in the packet buffer so as to convert the absolute URL into a corresponding relative URL in the web page, the modifying including:

removing a selected character of the detected absolute URL and adding a "/" before the transmission protocol portion of the detected absolute URL, replacing the colon located after the transmission protocol portion of the detected absolute URL with a predetermined character, maintaining a same number of characters in the relative URL as found in the detected absolute URL, and retaining the at least a portion of the detected absolute URL in the packet buffer of the forwarding path during the modifying.

2. The method of claim 1 wherein the step of detecting an absolute URL includes the step of detecting the colon in the URL.

3. The method of claim 1 wherein the predetermined character includes an alphanumeric character.

4. The method of claim 1 further comprising the step of transmitting the web page from the gateway to the client terminal, after the modifying step.

5. The method of claim 1 wherein the modifying further comprises:
locating the transmission protocol portion of the detected absolute URL.

6. The method of claim 1 wherein the modifying further comprises:
substituting a "http://" portion of the detected absolute URL with "httpX//", wherein "X" is a predetermined character.

7. The method of claim 1 wherein the modifying further comprises:
substituting a "http:" portion of the detected absolute URL with "/http".

8. The method of claim 1 wherein the modifying further comprises:
scanning only a limited number of characters located at the beginning of the detected absolute URL; and
based on the scanning of only the limited number of characters, modifying the detected absolute URL.

9. The method of claim 1 wherein the gateway is a secure socket layer virtual private network (SSLVPN) gateway coupled to one or more private networks, and configured to provide secure access to the one or more private networks.

10. A method of performing URL mangling, comprising:
receiving, at a gateway, an access request from a client terminal for a web page;
receiving the requested web page at the gateway;
detecting a URL in the web page, the URL having a transmission protocol portion, and a colon located after the transmission protocol portion;
placing at least a portion of the detected URL in a packet buffer of a forwarding path at the gateway; and
mangling the at least a portion of the detected URL, by the gateway, to create a relative URL, by removing a selected character and adding a "/" before the transmission protocol portion, and replacing the colon with a predetermined character, while
maintaining a same number of characters in the relative URL as found in the detected URL, and
retaining the at least a portion of the detected URL in the packet buffer of the forwarding path during the mangling.

11. The method of claim 10 wherein the transmission protocol portion includes an indication of hyper text transmission protocol.

12. The method of claim 10 wherein the access request is received over a public data network.

13. The method of claim 10 wherein the requested web page is received over a private data network.

14. The method of claim 13 wherein the requested web page is received from a web server in the private data network.

15. A method of providing URL mangling, comprising:
detecting an absolute URL in a web page received at a gateway from a web server, the web page having been requested by a client terminal;
storing at least a portion of the detected absolute URL in a packet buffer of a forwarding path at the gateway, the detected absolute URL having a transmission protocol portion, and a colon located after the transmission protocol portion; and
performing URL mangling on the detected absolute URL at the gateway before providing the web page to the client terminal, the URL mangling modifying the at least a portion of the detected absolute URL so as to convert the detected absolute URL into a relative URL by:
removing a selected character of the detected absolute URL and adding a "/" before the transmission protocol portion of the detected absolute URL, and
replacing the colon located after the transmission protocol portion of the detected absolute URL with a predetermined character, while
maintaining a same number of characters in the relative URL as found in the detected absolute URL, and
retaining the at least a portion of the detected absolute URL in the packet buffer of the forwarding path during the URL mangling.

16. The method of claim 15 wherein the predetermined character includes an alphanumeric character.

17. The method of claim 15 wherein the step of detecting the absolute URL includes the steps of:
scanning the web page; and
identifying the colon in the URL.

18. The method of claim 17 wherein the colon is located immediately following a transmission protocol portion of the URL.

19. The method of claim 18 wherein the transmission protocol portion includes an indication of hyper text transmission protocol (http).

20. A system for providing URL mangling, comprising:
a web server; and
a gateway operatively coupled to the web server via a network connection, the gateway configured to
receive a web page from the web server,
scan the received web page to detect an absolute URL in the webpage,
store at least a portion of the detected absolute URL in a packet buffer of a forwarding path at the gateway, the detected absolute URL having a transmission protocol portion, and a colon located after the transmission protocol portion, and
modify the at least a portion of the absolute URL in the web page so as to convert the absolute URL into a relative URL by:
removing a selected character of the detected absolute URL and adding a "/" before the transmission protocol portion of the detected absolute URL, and
replacing the colon located after the transmission protocol portion of the detected absolute URL with a predetermined character, wherein the relative URL has a same number of characters as found in the absolute URL in the web page, and the modifying is performed while the at least a portion of the URL is maintained in the packet buffer of the forwarding path.

21. The system of claim 20 wherein the gateway includes a secure socket layer virtual private network (SSLVPN) gateway.

22. The system of claim 20 wherein the gateway is operatively coupled to a private data network including the web server.

23. The system of claim 20 further including a client terminal operatively coupled to the gateway over a public data network.

24. The system of claim 23 wherein the gateway is configured to transmit the web page with relative URL to the client terminal.

25. The system of claim 20 wherein the gateway is configured to modify the absolute URL in the web page to the relative URL by being configured to substitute a "http://" portion of the absolute URL with "httpX//", wherein "X" is a predetermined character.

26. The system of claim 20 wherein the gateway is configured to modify the absolute URL in the web page to the relative URL by being configured to substitute a "http:" portion of the detected absolute URL with "/http".

27. The system of claim 20 wherein the gateway is configured to modify the absolute URL in the web page to the relative URL by being configured to scan only a limited number of characters located at the beginning of the absolute URL and based on the scan of only the limited number of characters, modify the absolute URL.

28. A system for providing URL mangling, comprising:
  means for receiving a web page requested by a client terminal at a gateway;
  means for scanning the web page at the gateway;
  means for detecting an absolute URL in the web page, the absolute URL having a transmission protocol portion, and a colon located after the transmission protocol portion;
  means for storing at least a portion of the detected URL in a packet buffer of a forwarding path at the gateway; and
  means for modifying, at the gateway, the at least a portion of the detected absolute URL so as to convert the detected absolute URL into a corresponding relative URL in the web page, the modifying include:
  removing a selected character of the detected absolute URL and adding a "/" before the transmission protocol portion of the detected absolute URL,
  replacing the colon located after the transmission protocol portion of the detected absolute URL with a predetermined character,
  maintaining a same number of characters in the relative URL as found in the detected absolute URL, and
  retaining the at least a portion of the detected URL in the packet buffer of the forwarding path during the modification.

* * * * *